United States Patent

[11] 3,595,594

[72] Inventor Orvil R. Aronson
34 Newberry Place, Grosse Pointe Farms, Mich. 48236
[21] Appl. No 868,822
[22] Filed Oct. 23, 1969
[45] Patented July 27, 1971

[54] MACHINE TOOL CHUCK
8 Claims, 8 Drawing Figs.
[52] U.S. Cl. .................................................. 279/117,
269/202, 269/218, 269/227
[51] Int. Cl. ............................................... B25b 1/06
[50] Field of Search ......................................... 269/225,
227, 202, 218; 279/117

[56] References Cited
UNITED STATES PATENTS
| | | | |
|---|---|---|---|
| 909,469 | 1/1909 | Solberg | 269/227 X |
| 1,089,362 | 3/1914 | Hannifin | 279/117 |
| 1,766,773 | 6/1930 | Bunker | 269/227 X |

FOREIGN PATENTS
| | | | |
|---|---|---|---|
| 186,200 | 1907 | Germany | 269/227 |
| 103,485 | 1924 | Switzerland | 269/227 |

*Primary Examiner*—Andrew R. Juhasz
*Assistant Examiner*—Donald D. Evenson
*Attorney*—Settle, Batchelder and Oltman ABSTRACT: A machine tool chuck of the two-jaw universal type which incorporates floating gears arranged between fixed and movable racks to reciprocate the chuck jaws to and from a workpiece clamping position. The floating gears are respectively drive connected to the jaws so that when an input force is applied to the movable racks and the clamping position is approached, the ratio between the input force and the output clamping force increases rapidly so that a substantial clamping force is imposed on the jaws for maintaining them in the clamping position. The clamping load is not imposed directly on the floating gears, but rather is transmitted directly to the massive chuck base. Clamping and unclamping motors provide the input forces for moving the jaws to and from the clamping position.

PATENTED JUL 27 1971          3,595,594

INVENTOR.
ORVIL R. ARONSON.
BY
SETTLE, BATCHELDER & OLTMAN.
ATT'YS.

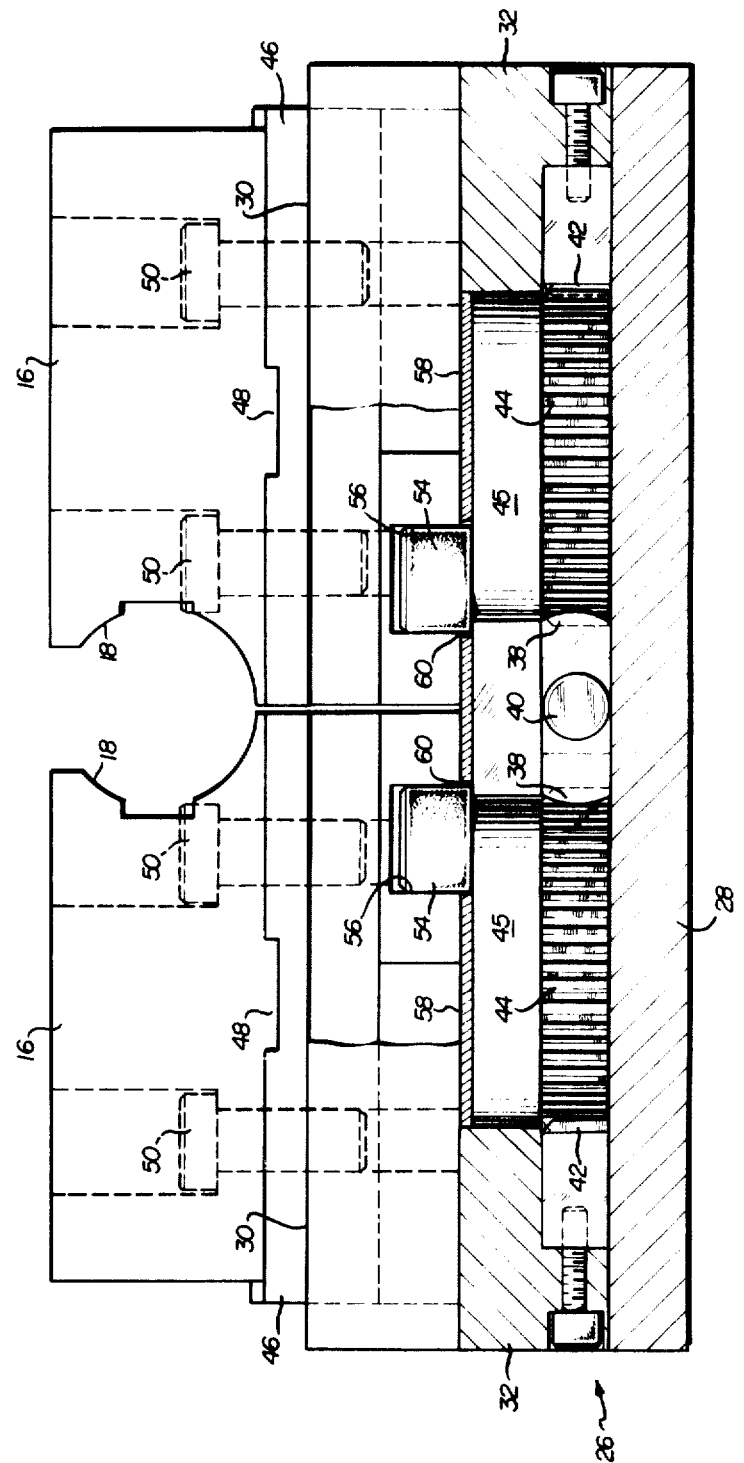

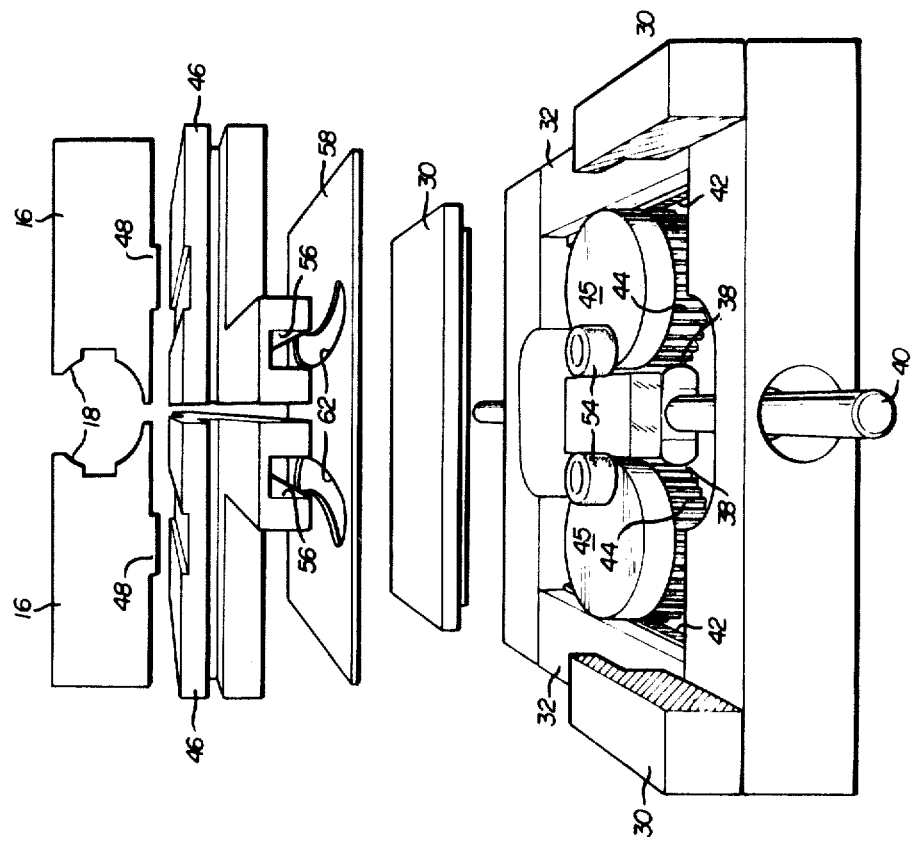

MACHINE TOOL CHUCK

This invention relates generally to machine tool chucks of the reciprocating jaw type.

With machine tools employing chucks, the chuck jaws are moved to and from and locked in a part clamping position by somewhat complicated mechanism, e.g., rather complex screw type or with some kind of overcenter lock are often used. Necessarily with the screw-type actuator, either a rotating driver is required or some form of apparatus to convert rectilinear motion to rotary motion. Also, screw motion is inherently time consuming and objectionable from a volume production standpoint.

With the foregoing in mind, a new and different chuck is contemplated that is capable of instantaneous actuation, that can be actuated by many different kinds of power sources, that can be actuated by rectilinear movements, and that is particularly suited for high-volume production machines.

Also contemplated is a chuck with a unique provision for substantially amplifying the clamping force as the full clamping position is approached so as to permit effective clamping over a substantial range of positions of the chuck jaws so as to avoid the need for close dimensional controls.

Further contemplated is a chuck with a unique gearing arrangement whereby initial movement of the chuck jaws towards the clamping position is relatively rapid and thereafter decreases with a corresponding increase in the clamping force.

Another objective is a chuck that employs floating gears arranged between movable and fixed racks to achieve both a variable travel ratio and a variable force that provides initial rapid movement of the chuck jaws towards the clamping position, which movement decreases as the clamping position is approached, and at the same time the clamping force increases proportionally to the decrease in the travel.

A further and related objective is a chuck of the gear type that isolates the clamping forces from the gears, and which transmits the clamping forces to the chuck base.

Also an objective is a chuck that permits the clamping position to vary to accommodate parts of varying dimensions without sacrificing clamping efficiency.

Another objective is to provide a chuck that will maintain relatively constant, the location of the center of workpieces with varying dimensions.

The foregoing and other objects and advantages of the invention will become apparent from the following description and from the accompanying drawings in which:

FIG. 3 is a sectional view of the chuck taken along line 3–3 in FIG. 2;

FIG. 8 is an exploded view of the chuck.

Figure 1:
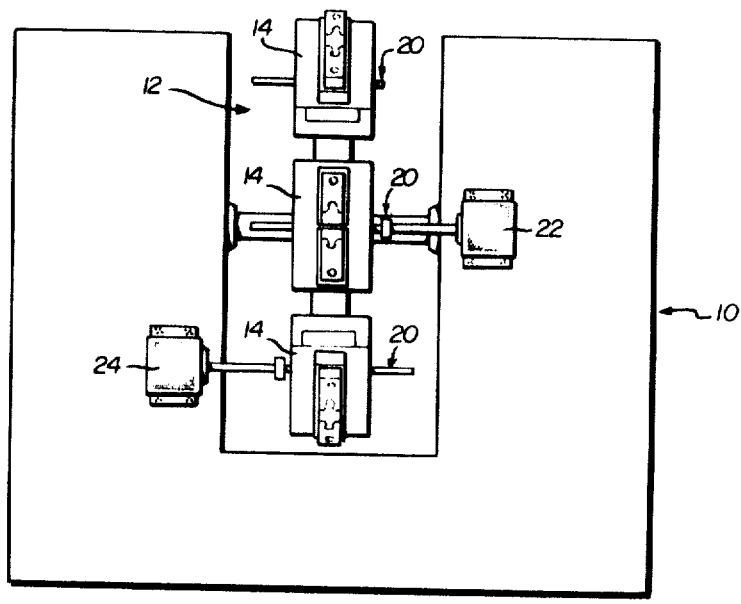
FIG. 1 is a schematic view of a multistation turret-type machine tool that has a series of mounted chucks incorporating the principles of the invention.
Figure 4:
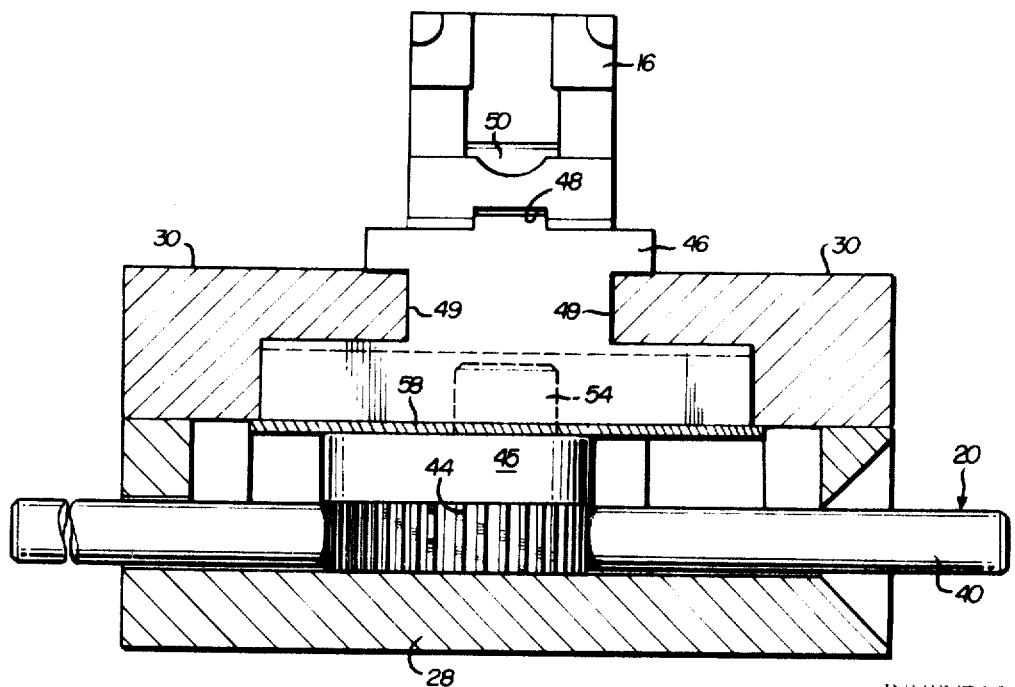
FIG. 4 is another sectional view of the chuck taken along line 4–4 of FIG. 2.
Figure 2:
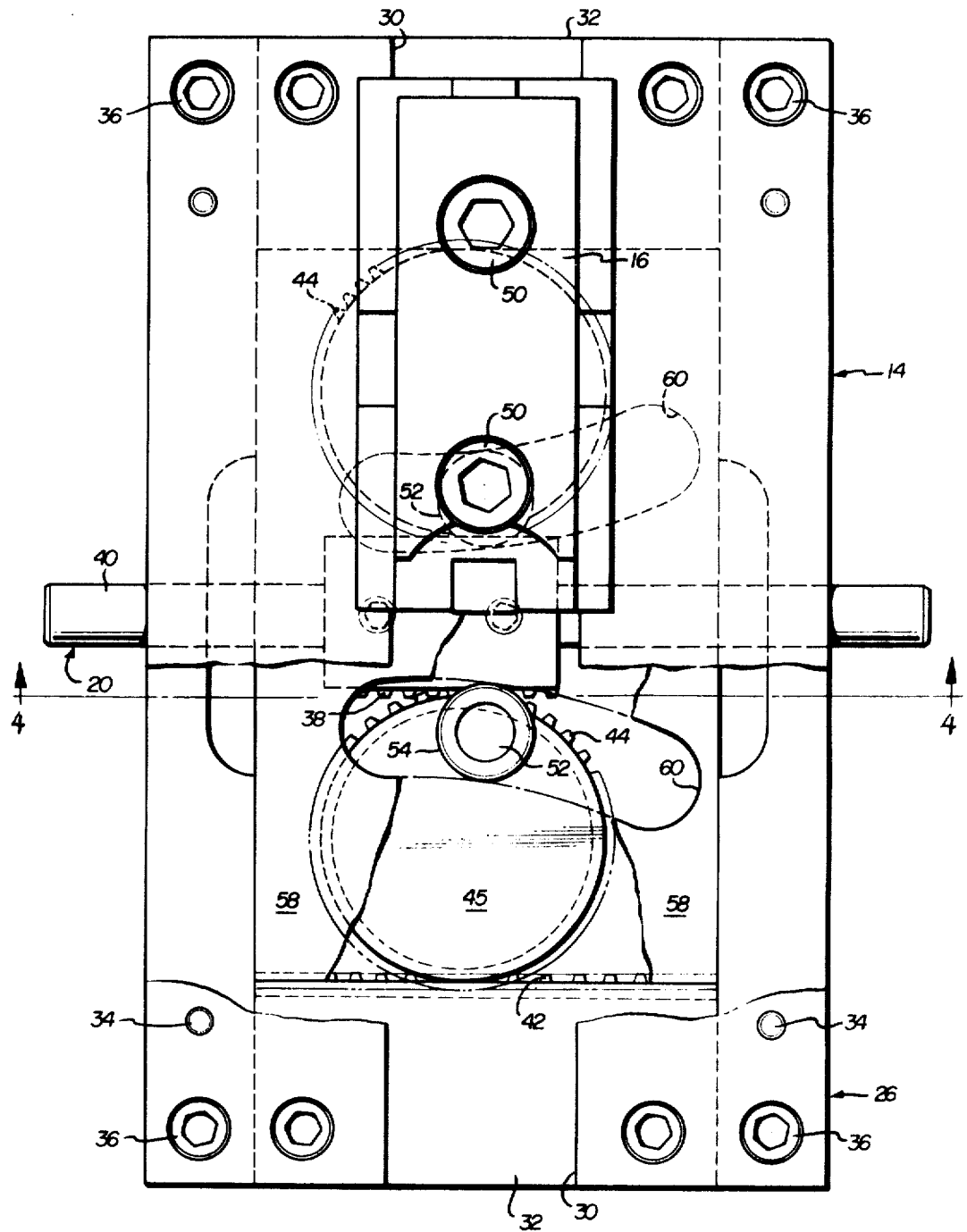
FIG. 2 is a plan view of one of the chucks with parts broken away.

Referring first to FIG. 1, the machine tool depicted and denoted generally by the numeral 10 is of the multiple station type with a turret 12 that is motor revolved and has mounted thereon the series of chucks 14. One should be mindful that the machine tool can be any of the known types requiring a chuck and having relative movement between the chuck and a cutting tool. In the depicted machine tool, as the turret 12 is indexed to each station, a particular operation is performed on a part or workpiece held by the associated chuck 14 such as drilling, threading, turning, etc. This operation is well understood by those versed in the art. Each of these chucks 14 has a pair of reciprocating jaws 16 provided with workpiece clamping faces 18, as viewed in FIG. 3 of a suitable configuration for engaging the workpiece to be machined. The jaws 16 are reciprocated to and from the clamping position with respect to the workpieces by an actuator noted generally at 20. The actuator 20 is maneuvered back and forth by clamping and unclamping motors 22 and 24 respectively arranged at the loading and unloading stations for machine 10. These motors 22 and 24 may be of many different forms, but for purposes of demonstration only, may be of the fluid pressure-operated piston type. When the clamping motor 22 is energized its piston will be extended into engagement with the actuator 20 to move it leftwardly, as observed in FIG. 1, and urge the jaws 16 to the clamping position. Similarly, the unclamping motor 24 will have its piston extended to move the actuator 20 rightwardly to unclamp the workpiece. Thereafter each motor 22 and 24 retracts to the starting position and the chucks 14 will remain in whatever position that has been established.

The chuck 14 has a housing shown generally at 26 for the actuator 20. This housing 26 has a bottom plate 28 on which are positioned side braces 30 and end braces 32. The alignment of the side braces 30 and the end braces 32, for reasons which will become apparent, is maintained relatively accurately; e.g., by locator dowels 34. These braces 30 and 32 and the bottom plate 28 are all suitably joined as by bolts 36.

The actuator 20 is of the rack and pinion type with the identical rack and pinion sets used to operate each of the jaws 16. A center gear provision is afforded by a pair of laterally opposed racks 38, which are attached to or made integral with a driver such as a drive rod 40. Opposite each of these racks 38 and in confronting spaced parallel relation therewith are fixed racks 42. These fixed racks 42 are attached in any appropriate way or could be made integral with end braces 32. Meshing with the racks 38 and 42 are floating gears 44 having axial extensions 45 of a diameter equal to the pitch diameter of the gear teeth of the gear 44.

Upon reciprocation of the drive rod 40, by the clamping and unclamping motors 22 and 24, these floating gears 44 rotate about their respective centers, and their centers will be displaced to follow a rectilinear path that is substantially parallel to the rectilinear path of reciprocation of the drive rod 40. This can be observed in FIG. 6 where the gears 44 are shown in each of their extreme unclamping and clamping positions.

Figure 5:
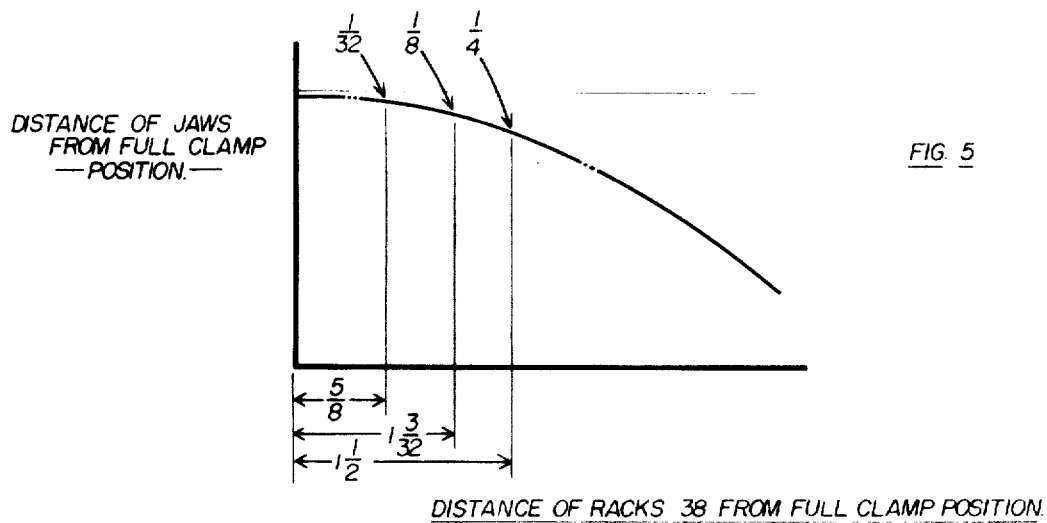
FIG. 5 is a graph showing the distance relationships between parts of the chuck.

This movement of the floating gears 44 is utilized to reciprocate the jaws 16 through the intermediary of jaw carriers 46. The jaws 16 have their alignment maintained relative to the jaw carriers 46 by a slot connection 48 and are joined together in any appropriate way such by screws 50 so as to be removable for replacement purposes, also, and as depicted in FIG. 5, the side braces 30 provide guideways at 49 which constrain the jaw carriers 46 to a path of rectilinear movement. To make the drive connection with the floating gears 44, each has formed as an integral part thereof or attached thereto an offset cam follower stud 52 surrounded by a cylindrical cam follower 54. Each follower 54 is slidably and revolvably received within a cam slot 56 in each jaw carrier 46. These cam slots 56 are arranged transverse to the direction of movement of the jaw carriers 46. The hardened base or extension 45 of the gears 44, being of a diameter corresponding to the pitch diameter of the gears 44, ride along the hardened mating surfaces of the end braces 32. Therefore, the gears 44 are not subjected to any of the clamping load because the clamping load is transferred from the jaws 16 to the jaw carriers 46 to the slots 56, the followers 54 in the slots 56, the gear bases 45 and to the end braces 32 in rolling contact with the base 45. The attachment of the gears 44 to their respective bases 45 can be by screws and dowels to ensure that the followers 54 are both positioned in the same way and also properly oriented relative to the floating gears 44.

To prevent debris from interfering with the operation of the gears 44 and the racks 38 and 42, a protective plate 58 is positioned over the enclosure for them. The plate 58 is provided with two slots 60 through which extend the bearings 54. If there is no debris problem the protective plate 58, of course, can be omitted.

Figure 6:
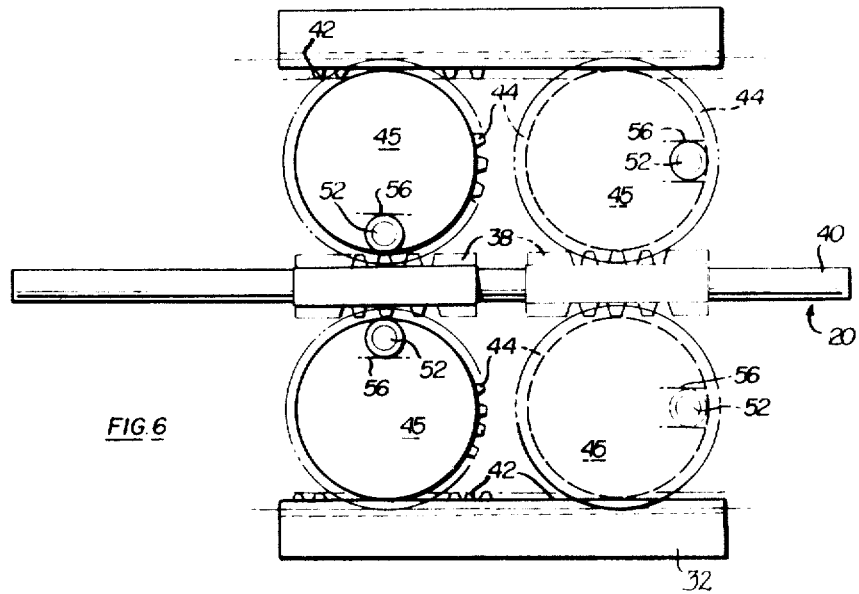
FIG. 6 is a schematic diagram of a rack and gear arrangement utilized by the chuck.

Considering now the operation, reference is first made to FIG. 6. It should be kept in mind that the cam slot 56 shown in FIG. 6 is a part of the jaw carrier 46 and therefore the jaws 16 move with and have a position corresponding to the position of the cam slot 56. In the broken line position of the floating gears 44 (FIG. 6), the jaws 16 are in their unclamping position, and in the solid line position, the jaws 16 are in their clamping position. Assuming then, that the chuck 14 had been unclamped by the unclamping motor 24, and that the clamping motor 22 is energized to move the jaws 16 to the clamping position, the drive rod 40, as viewed in FIG. 6, will be urged leftwardly, causing the floating gears 44 to move towards their solid line positions. The followers 52 will therefore each pursue a path similar to the FIG. 5 curve.

If for demonstration purposes only, it is assumed that the floating gears 44 each have 45 teeth, a pitch of 20, and a pitch diameter of 2¼ inches, then with reference to FIG. 5 when the racks 38 are approximately 1½ inches from the full clamping position; i.e., the solid line position of the gears 44 with their centers and the centers of the followers 52 in vertical alignment, the cam slot 56 and accordingly the jaw 16 will be one-fourth of an inch from the full clamping position corresponding to 0 in FIG. 5. At this point, the instantaneous ratio between the distance of one of the racks 38 and its associated jaw 16 from the full clamping position is 6 to 1. Since the clamping force imposed on the jaws 16 is directly proportional to the ratio between these distances a 1 pound of input imposed upon the rack 38, by the clamping motor 22 will result in a 6-pound clamping force being generated at the jaw 16. When the rack 38 is 1 three thirty-seconds inches from the full clamping position, the associated jaw 16 will have traveled one-eighth of an inch and now be one-eighth of an inch from the full clamping position. The distance ratio will have increased to 8.75 to 1. When the rack 38 is five-eighths of an inch from the full clamping position, the jaw 16 will have moved to within one thirty-second of an inch of the full clamping position and this movement increases the ratio to 20 to 1. With a 20 to 1 ratio, a 1-pound input will develop a 20-pound output. Theoretically, this ratio approaches infinity as the jaws 16 move towards full clamping position.

Figure 7:
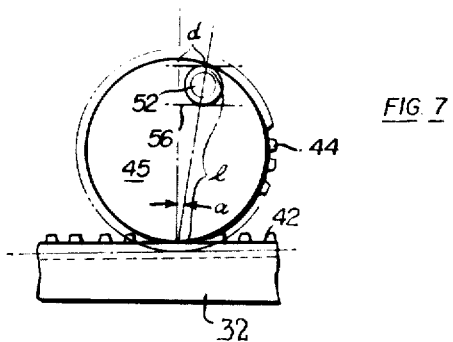
FIG. 7 is a schematic diagram of angular relationships of the FIG. 5 arrangement as the full clamping position is approached.

Thus it will be appreciated that initially there is a rapid movement of the jaw 16 towards the full clamping position which will gradually diminish as the full clamping position is approached. As this movement slows, there is a substantial buildup in the clamping force. Because of this substantial buildup in the clamping force, whether or not the vertical or full clamping position is reached is not critical. For example and again without limitation, as observed in FIG. 7, if the follower 54 is assumed to be at a distance "$d$" equivalent to one-half of an inch from the vertical position and that the distance "$l$" from the follower 54 to the contact point of gear base 45 against brace 32 is 2 inches, the angle "$a$" will be approximately 14°, i.e., from the vertical position. It has been determined that the jaws 16 can be positioned anywhere within this substantial range of 0°—14° and still maintain clamping. Therefore, there is no need for close dimensional control in an attempt to always be at the vertical position or what may be referred to as the full clamping position in which the centers of the followers 52 and the gears 44 and the mesh points at 62 shown in FIG. 7 are all aligned. Also one does not have to be concerned about normal workpiece dimensional variations and their influence on the full clamping position. The center of the workpiece will always be centered, i.e., located in the same position, regardless of the variations in the dimensions of the workpiece.

When the unclamping motor 24 is again energized to return the floating gear and jaw 16 to their unclamped broken line positions displayed in FIG. 6, the cycle will have been completed.

From the foregoing, it will be appreciated that the chuck 14 affords instantaneous operation with initial closing movement occuring rapidly. As the full clamping position is approached, the clamping force increases very rapidly so as to provide adequate clamping over a relatively wide range of clamping positions.

The transmission of the clamping force from the cam follower 54 through the hardened gear base 45 directly to the brace 32 effectively isolates the teeth of gear 44 from the crushing load which otherwise would be imposed thereon. Thus, standard gears can be used, there will be no tooth distortion, and no out-of-roundness will occur in the gears 44. These advantages in cost, operating efficiency and service life will be readily appreciated.

What I claim is:

1. A chuck comprising a pair of movable jaws; and actuating means for reciprocating the jaws between clamping and unclamping positions; the actuating means including a pair of opposed fixed racks, a pair of floating gears respectively engaging the racks, each gear including a follower drive connected to a respective one of the jaws, gear means for reciprocating the gears along the fixed racks so as to move the jaws to and from the clamping position, and means for isolating the jaw-clamping load from said floating gears.

2. In a chuck having a pair of movable jaws; actuating means for reciprocating the jaws to and from a clamping position, the actuating means including a pair of opposed fixed racks arranged in confronting and substantially parallel relation, a pair of floating gears respectively engaging the fixed racks, each of the floating gears having a follower, drive means connecting each such follower to a respective one of the jaws, and rack means positioned between the gears and arranged for reciprocating movement so as to move the gears back and forth along the fixed racks and thereby move the followers so as to reciprocate the jaws to and from the clamping position.

3. A chuck as described in claim 2 wherein the rack means is a pair of laterally opposed movable racks.

4. A chuck as set forth in claim 2, including a gear base concentric with each of said floating gears and of a diameter equal to the pitch diameter of said gear, and a brace surface adjacent each fixed rack located at the pitch diameter of said racks, each of the gear bases and the respective brace surface being in force-transmitting contact to isolate the gears from any clamping load.

5. A chuck comprising a pair of movable jaws; actuating means for reciprocating the jaws to and from a clamping position; the actuating means including a driver arranged to be reciprocated, the driver having movable therewith a pair of laterally opposed racks positioned in substantial parallel relation with each other, a pair of opposed fixed racks, each fixed rack being spaced from and being arranged in confronting substantially parallel relation to a respective one of the driver reciprocated racks, a pair of floating similar gears respectively meshing with the fixed and driver-reciprocated racks, the pair of gears each having a follower drive connected to a respective one of the jaws so as to move the associated jaw to and from the clamping position in which the followers and the center of the gears and the mesh points between the gears and the fixed racks all approach alignment.

6. A chuck as described in claim 4, wherein the jaws are each connected to a jaw carrier having a cam surface engageable with the follower on the associated gear.

7. A chuck as described in claim 3, further including guideways and a pair of jaw carriers each having a jaw secured thereto and each having a transverse cam slot therein and wherein the followers each include a bearing engageable with a respective one of the cam slots.

8. A chuck comprising a housing, a pair of jaws movably supported by the housing; actuating means carried by the housing for reciprocating the jaws between clamping and unclamping positions; the actuating means including a pair of opposed racks fixed relative to the housing, a pair of floating gears respectively engaging the racks, each gear including an annular base engageable with the housing and revolvable thereon and a follower in the base, the follower being drive connected to a respective one of the jaws, and gear means for reciprocating the gears along the fixed racks so as to move the jaws to and from the clamping position in which the clamping load is transferred from the jaws by way of the followers and the bases to the housing.